United States Patent [19]

Lapeyre

[11] Patent Number: 5,024,321

[45] Date of Patent: * Jun. 18, 1991

[54] MODULAR CENTER DRIVE CONVEYOR BELT

[75] Inventor: James M. Lapeyre, New Orleans, La.

[73] Assignee: Laitram Corporation, Harahan, La.

[*] Notice: The portion of the term of this patent subsequent to May 23, 2006 has been disclaimed.

[21] Appl. No.: 501,963

[22] Filed: Mar. 29, 1990

Related U.S. Application Data

[63] Continuation of Ser. No. 363,354, Jun. 2, 1989, abandoned, which is a continuation of Ser. No. 118,309, Nov. 6, 1987, abandoned, which is a continuation of Ser. No. 179,523, Aug. 19, 1980, Pat. No. 4,832,187.

[51] Int. Cl.⁵ .............................................. B65G 17/06
[52] U.S. Cl. .................................................... 198/853
[58] Field of Search ........................ 198/834, 851–853; 474/156, 157, 206, 207, 212, 219, 223, 224, 228, 232, 234, 235; 24/31 H, 33 B, 33 P, 33 K

[56] References Cited

U.S. PATENT DOCUMENTS

| Re. 30,341 | 7/1980 | Lapeyre | 198/834 |
|---|---|---|---|
| 811,391 | 1/1906 | Gates | 474/224 |
| 1,046,124 | 12/1912 | Wagner | 474/224 |
| 2,000,499 | 5/1935 | Roland | 198/189 |
| 2,222,381 | 11/1940 | Tennefos | 24/33 |
| 2,391,485 | 12/1945 | Simmons et al. | 262/33 |
| 2,553,646 | 5/1951 | Field | 305/10 |
| 2,815,117 | 12/1957 | Lapeyre et al. | 198/213 |
| 2,911,091 | 11/1959 | Imse | 198/189 |
| 3,066,549 | 12/1962 | Benjamin | 74/254 |
| 3,216,053 | 11/1965 | Felix | 16/128 |
| 3,390,419 | 7/1968 | Foltz | 16/169 |
| 3,475,784 | 11/1969 | Foltz | 16/169 |
| 3,602,364 | 8/1971 | Maglio et al. | 198/853 |
| 3,641,831 | 2/1972 | Palmaer | 74/250 |
| 3,724,285 | 4/1973 | Lapeyre | 74/243 |
| 3,726,569 | 4/1973 | Maglio et al. | 474/224 |
| 3,870,141 | 3/1975 | Lapeyre et al. | 198/193 |
| 3,941,238 | 3/1976 | Lapeyre | 198/184 |
| 4,006,817 | 2/1977 | Paul | 198/853 |
| 4,051,949 | 10/1977 | Lapeyre et al. | 198/853 |
| 4,084,687 | 4/1978 | Lapeyre | 198/844 |
| 4,105,111 | 8/1978 | Lapeyre | 198/844 |
| 4,138,011 | 2/1979 | Lapeyre | 198/844 |
| 4,153,152 | 5/1979 | Lapeyre | 198/851 |
| 4,154,333 | 5/1979 | Lapeyre | 198/707 |
| 4,159,763 | 7/1979 | Kewley et al. | 198/853 |
| 4,170,281 | 10/1979 | Lapeyre | 198/844 |
| 4,171,045 | 10/1979 | Lapeyre | 198/853 |
| 4,184,588 | 1/1980 | Lapeyre | 198/778 |
| 4,213,527 | 7/1980 | Lapeyre et al. | 198/853 |
| 4,276,980 | 7/1981 | Oizumi | 198/853 |
| 4,566,142 | 12/1985 | Lapeyre | 198/822 |
| 4,709,807 | 12/1987 | Poerink | 474/224 |
| 4,729,469 | 3/1988 | Lapeyre | 198/834 |
| 4,832,187 | 5/1989 | Lapeyre | 474/212 |

FOREIGN PATENT DOCUMENTS 113669 11/1899 Fed. Rep. of Germany .
292330 6/1932 Italy .................................. 474/223

OTHER PUBLICATIONS

KVP Specifications, Copyright 1976.

Primary Examiner—Joseph E. Valenza
Attorney, Agent, or Firm—Weingarten, Schurgin, Gagnebin & Hayes

[57] ABSTRACT

A conveyor belt composed of a plurality of interconnected modules, each of identical construction and end to end mateable. Each module includes a multiplicity of elongated parallel spaced link elements terminating in first and second link ends. An intermediate section between the link ends is of grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. These intermediate sprocket recesses provide the benefit of minimizing chordal action and scrubbing between the mating surfaces of the module and sprocket.

48 Claims, 4 Drawing Sheets

MODULAR CENTER DRIVE CONVEYOR BELT

The present application is a continuation of application Ser. No. 07/363,354, filed Jun. 2, 1989 now abandoned, which is a continuation of application Ser. No. 07/118,309, filed Nov. 6, 1987 now abandoned, which is a continuation of application Ser. No. 06/179,523, filed Aug. 19, 1980 issued as U.S. Pat. No. 4,832,187.

FIELD OF THE INVENTION

This invention relates to conveyors and more particularly to a modular conveyor belt composed of interconnected like modules.

BACKGROUND OF THE INVENTION

A module conveyor belt is the subject of U.S. Pat. No. 3,870,141 and which comprises modules pivotally connected to one another, each module being molded as a single unit, preferably of a plastic material. Each module includes a number of parallel spaced links having end sections with aligned holes for accommodation of pivot rods, and intermediate sections joined by integral cross members to form a rigid supporting grid. The modules are end to end mateable; that is, a module is capable of being connected to or mate with a like module at its ends irrespective of which end of which module is employed. The conveyor module thus formed is simple and inexpensive to manufacture and assemble into a conveyor belt or the like of any width and length.

In U.S. Pat. No. 4,051,949 there is shown a variant of the above-described conveyor belt and which is operative to transport articles to and from a conveyor comb. This conveyor comprises modules similar to those shown in U.S. Pat. No. 3,870,141 and includes on each module a plurality of links or ribs which are upwardly extending to provide an upper surface above the surface of the cross members to provide axial passageways into which the teeth of the conveyor comb can extend while the belt is in motion.

In copending application Ser. No. 013,165, filed Feb. 25, 1979, entitled Link Chain Belt, there is shown a link structure in which a driving tooth protrudes from the link at a position intermediate the pivot axes at the link ends. The location of the driving tooth midway between the pivot axes and the configuration of the driving tooth surfaces, when employed in conjunction with an associated sprocket wheel configuration, exhibits substantially low scrubbing action and small chordal action. Scrubbing action is known in relation to chain belts wherein the link teeth and sprocket teeth engage one another with a scrubbing or rubbing contact. Chordal action in chain drives is also known and comprises a vibratory motion of the chain as it engages the sprocket wheel.

SUMMARY OF THE INVENTION

In brief, the present invention provides a conveyor belt which is similar to and an improvement over the aforesaid structures. The novel belt is composed of a plurality of interconnected modules, each of identical construction and which are symmetrical such that any linking end of a module can be connected to any linking end of an adjacent module. Each module includes a multiplicity of elongated parallel spaced link elements terminating in first and second link ends. An intermediate section between the link ends is of grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. These intermediate sprocket recesses provide the benefit of minimizing chordal action and scrubbing between the mating surfaces of the module and sprocket. Aligned openings are provided in the link ends for accommodation of pivot rods by which modules are linked together. Retaining pins are inserted in the module ends for retention of the pivot rods.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
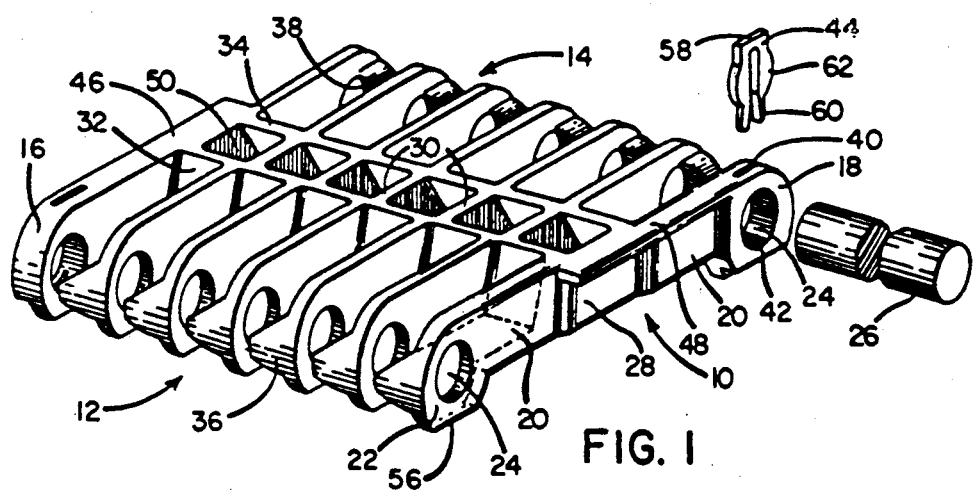
FIG. 1 is a perspective view of a conveyor module embodying the invention.
Figure 2:
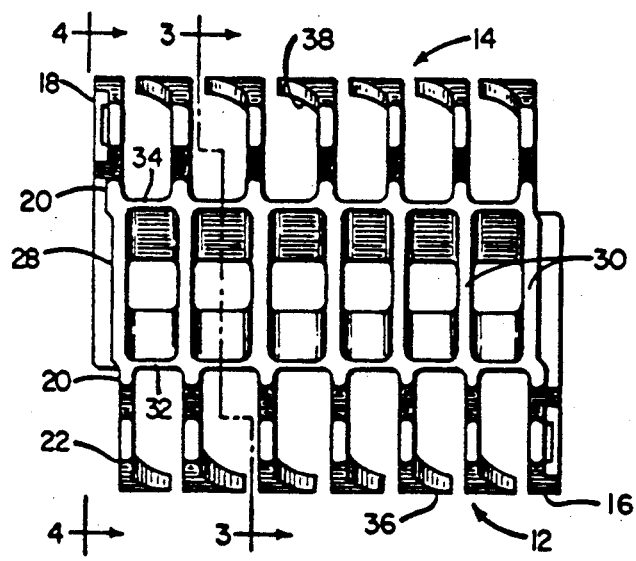
FIG. 2 is a bottom view of the module of FIG. 1.
Figures 3, 4:
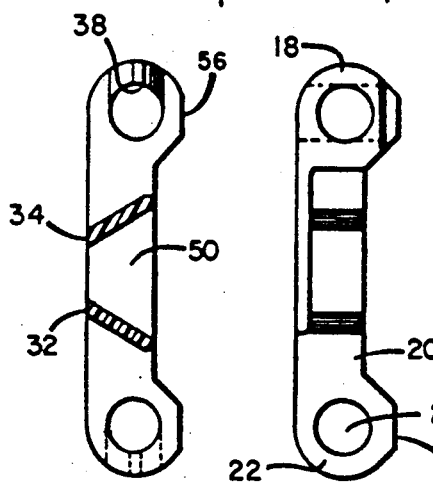
FIG. 3 is a sectional view taken along lines 3—3 of FIG. 2.
FIG. 4 is a sectional view taken along lines 4—4 of FIG. 2.
Figure 5:
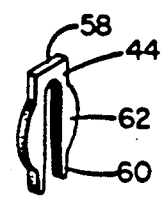
FIG. 5 is a perspective view of a retaining pin useful in the invention.

Referring to the drawing and particularly FIGS. 1–4, there is shown a module 10 which is interconnected with like modules to produce a modular conveyor belt in accordance with the invention. Each module 10 is formed as an integral unitary structure of plastic material by well-known injection molding or other molding processes. Each module 10 includes a multiplicity of elongated parallel spaced link elements, the length of the module being equal to the length of the link elements, and the width of the module being determined by the number of link elements. The module includes a first plurality of link ends 12 and a second plurality of link ends 14, each of which is identical in construction except for diagonally opposite outer link ends 16 and 18. Each link end 12 and 14 includes a section 20 terminating in an end section 22 which encircles an opening 24. The openings 24 of the respective link ends are aligned along a common axis and accommodate a pivot rod 26 inserted therethrough. The link ends 12 and 14 are joined by an intermediate section 28 which is of grid-like structure composed of longitudinal sections 30 and transverse sections 32 and 34. The intermediate sections 30 are parallel to and laterally offset from the link ends. The intermediate sections 32 and 34 are angled toward the respective link ends.

Figure 6:
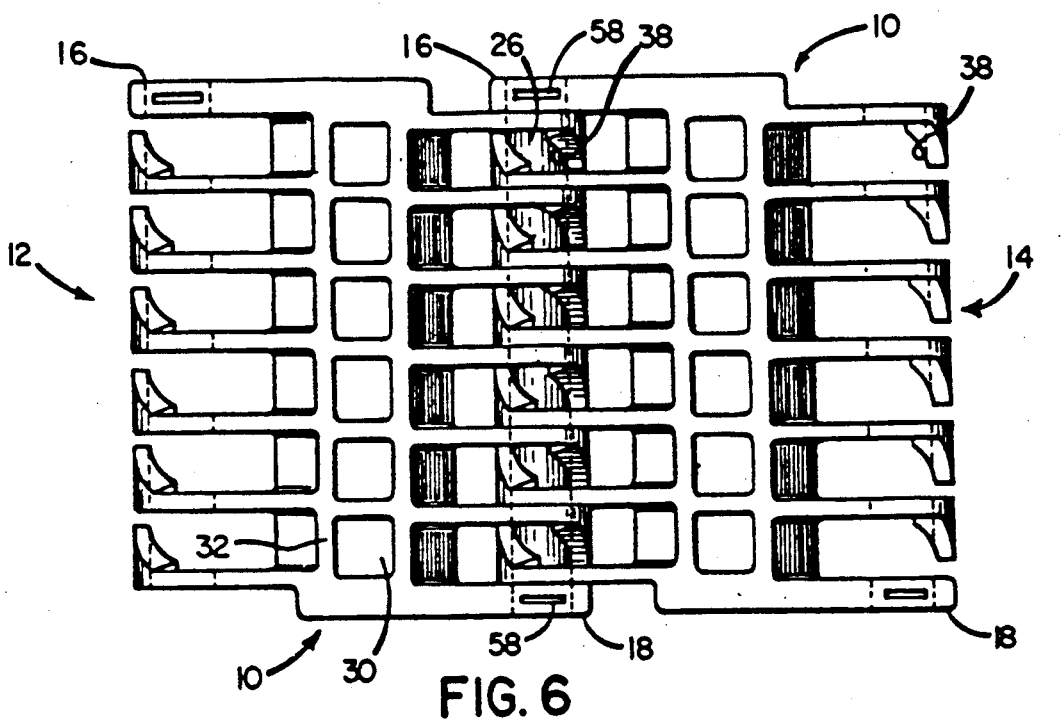
FIG. 6 is a top view of a pair of interconnected modules.

Triangular projections 36 are provided on each link end, except for ends 16 and 18, and extend transversely of the link, terminating short of the confronting link end by an amount to accommodate the link end of a mated link module. These projections serve as spacers to maintain interconnected modules in intended linked position as seen in FIG. 6. The inner surface 38 of projections 36 are cylindrically contoured to mate with the cylindrical surface of a pivot rod 26. These projections provide sufficient bearing surface area to accommodate the tensile forces of the interconnected modules being driven along a conveyor path, while providing exposure of significant portions of the pivot rod for ease of visual inspection and cleaning. The exposed pivot rod is also more responsive to temperature changes and tends to expand and contract by the same amount as the link structure. The skewed edges of the projections 36 also serve as wipers to push debris which may collect on the pivot rod away from the bearing area.

The diagonally opposite outer link ends 16 and 18 are thicker than the other end sections 22 and each includes slots 40 and 42 for accommodation of a retaining pin 44 which retains the pivot rod 26 within the aligned openings 24 of the mated modules. The outer link ends 16 and 18 are joined to respective side rails 46 and 48 which serve as rub rails to minimize damage to the sides or side edges of the module.

Figure 7:
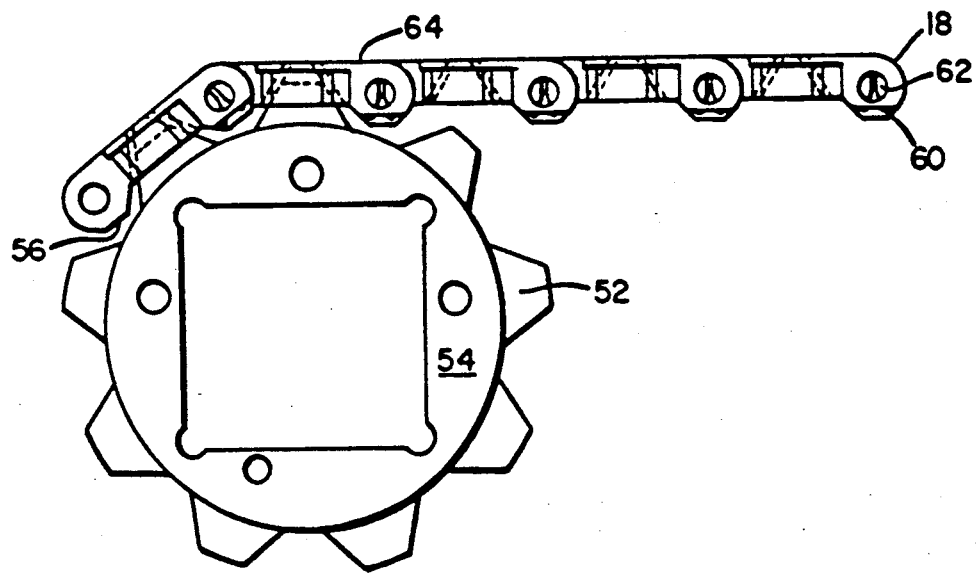
FIG. 7 is an elevation view of a modular conveyor belt embodying the invention and cooperative with a sprocket wheel.
Figure 8:
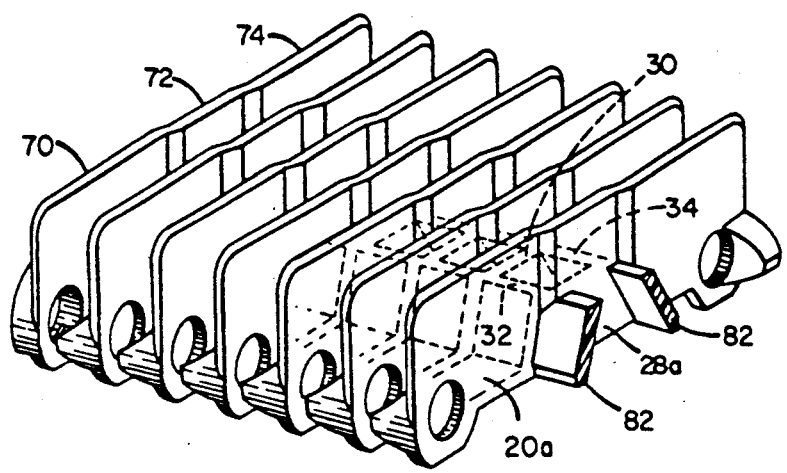
FIG. 8 is a perspective view of an alternative embodiment of the module of FIG. 1.
Figure 10:
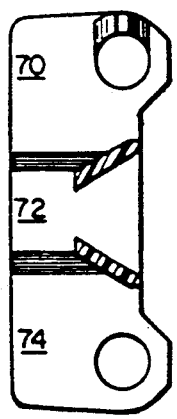
FIG. 10 is a sectional view taken along lines 10—10 of FIG. 9.
Figure 11:
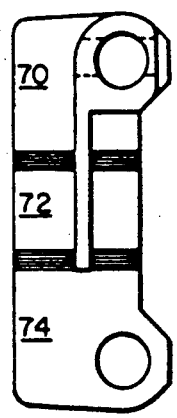
FIG. 11 is a sectional view taken along lines 11—11 of FIG. 9.
Figure 9:
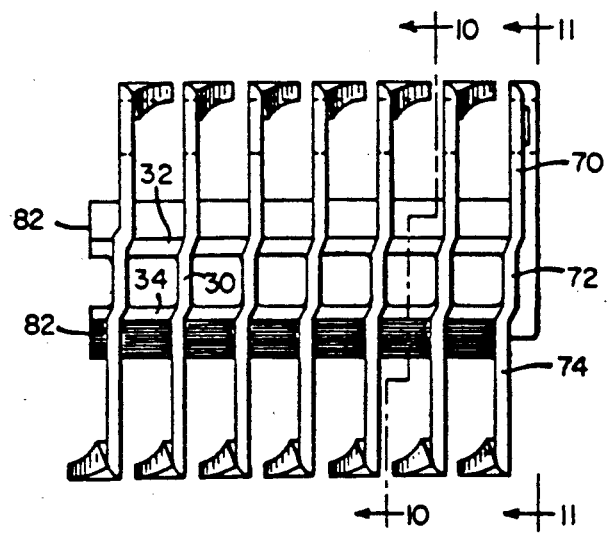
FIG. 9 is a top view of the module of FIG. 8.

The intermediate section 28 of the module composed of sections 30, 32, and 34, serves as a box beam across the width of the module which provides a structurally strong and lightweight module which is resistant to bending and which maintains its structural integrity under operating forces. The recesses 50 provided by the sections 30, 32, and 34 are operative as sprocket recesses located midway between the pivot axes of the module and which are adapted to mate with corresponding sprocket teeth 52 of an associated sprocket wheel 54, as shown in FIG. 7. The sprocket teeth 52 of the sprocket wheel include parallel side surfaces and inclined front and back surfaces configured to engage the corresponding surfaces of sprocket recesses 50. In the illustration of FIG. 7, the sprocket wheel 54 is adapted to be secured on a square shaft. A plurality of sprocket wheels is employed across the width of the module to provide intended support and driving force. The end sections of the module include flatted portions 56 to provide clearance between the linked modules and the sprocket wheel.

The sprocket recesses 50 can be considered as the inverse of the center sprocket teeth shown in copending application Ser. No. 013,165 and provide the same benefits of minimizing chordal action and scrubbing between the mating surfaces of the module and sprocket wheel. The placement of the sprocket recesses midway between the pivot axes, and the driving of the modules at this mid-position, rather than driving the modules at the position of the pivot axes as is conventionally done, provides substantially constant speed drive of the conveyor belt, substantially eliminates sprocket-to-belt wear, and provides a belt capable of faster running speeds than conventional belts by reason of the minimized chordal action and scrubbing.

The angled surfaces 32 and 34 of the intermediate section also serve to present greater surface area to water and/or steam jets which can be located above and below the modules for cleaning of the belt. The angled sections also facilitate visual inspection of the belt.

The modules are interconnected as illustrated in FIG. 6 by insertion of a pivot rod 26 between the aligned openings 24 of each pair of modules, and by insertion of retaining pins 44 into slots 40 and 42 of end sections 16 and 18 to secure the pivot rod within the linked modules. The pivot rod 26 is of a length to extend between the confronting inner surfaces of the retaining pins 44 to provide support of all linked ends. The retaining pins 44 are easily inserted by pushing each pin downwardly through a respective slot 40 and into seated engagement, with the upper portion 58 of the pin disposed within upper slot 40, the lower leg portions 60 disposed within slot 42, and the rounded midsection 62 secured within circular opening 24 of the associated end section. The retaining pin is sufficiently resilient for the legs to squeeze together as the pin is inserted, and once in seated position, to spring open to retain the pin within the end section. Removal of the pin is accomplished by pushing on the legs of the pin in lower slot 42, such as by a small screwdriver, to urge the pin out of the slots. Typically, the retaining pins can be fabricated in strip form by thin webs which join the top portion 58 and the legs of an adjacent pin. In use, individual pins are broken or cut from the interconnecting web as the pin is needed for insertion into the module end.

The modules are end-to-end reversible such that either linking end of the module can be joined to either linking end of an adjacent module. The edges of an assembled conveyor belt formed of these modules are in line as provided by the side rails 46 and 48, and the entire belt can be closely adjacent to a conveyor trough or side walls within which a product is conveyed on the conveyor surface 64 of the belt. The belt length can be changed in increments of one pitch by reason of the symmetry of the modules. The sprocket recesses 50 are in line and can be driven in either direction. The associated sprocket teeth are also symmetrical and in line such that the sprocket wheel can be driven in either direction and installed either way on a driving shaft.

Figure 12:
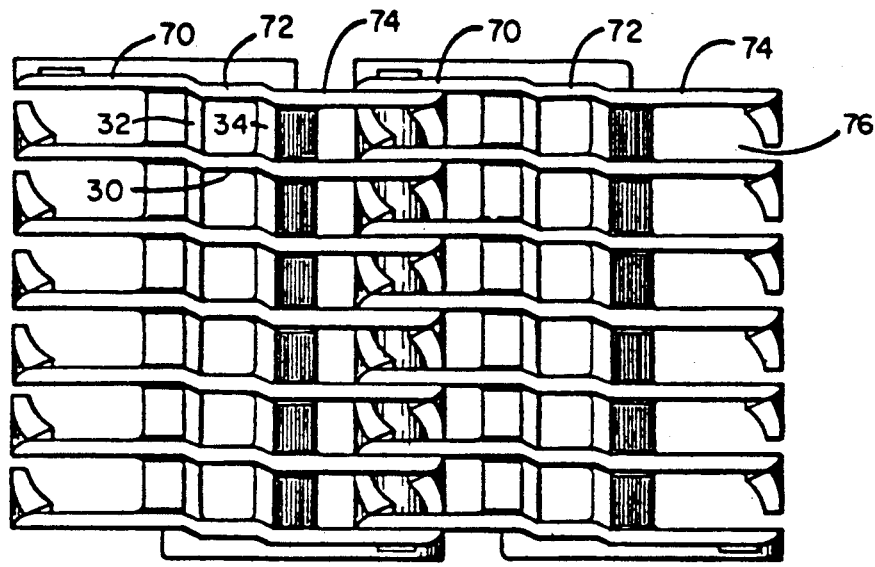
FIG. 12 is a top view of a pair of interconnected modules of FIG. 8.
Figure 14:
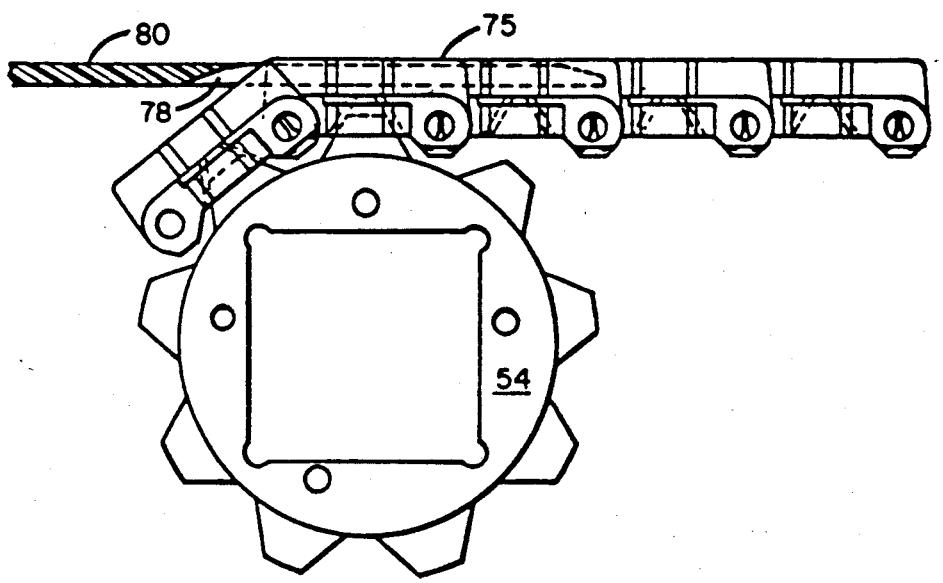
FIG. 14 is an elevation view of a conveyor belt composed of the modules of FIG. 8 and cooperative with a sprocket wheel.

An alternative embodiment is shown in FIGS. 8-11 in which the link sections are upwardly extending to provide an upper conveyor surface with axial passageways into which the teeth of a conveyor comb can extend while the belt is in motion. The sections 20a and 28a upwardly extend as raised flights or ribs which extend above the sections 30, 32, and 34 of the box beam intermediate section of the module. These raised ribs, identified by reference numerals 70, 72, and 74, are parallel to and laterally offset from each other, as are the link sections of the embodiment described above. The interconnected modules, as shown in FIG. 12, provide a substantially flat conveying surface 75, and the raised ribs define longitudinal channels 76 which are adapted to receive the teeth 78 of a conveyor comb 80 for transfer of products to and from the conveyor belt. As seen in FIG. 14, the conveyor comb 80 is disposed as a continuation of the conveying surface at a position at which the conveyor belt moves in a curved path around an associated sprocket wheel 54. The teeth 78 of the conveyor comb are disposed within respective channels 76 between the raised ribs, and preferably have inclined upper surfaces which taper downwardly from the comb surface to the teeth ends which lie below the conveying surface of the raised ribs. Typically, the comb is mounted for rotation about a pivot pin at the end opposite to the comb teeth and is spring loaded to urge the teeth into engagement with the upper surfaces of the intermediate section of the belt modules. The operation of this embodiment in conjunction with a conveyor comb is similar to the operation of the conveyor belt of U.S. Pat. Nos. 4,051,949 and 4,171,045, both assigned to the Assignee of this invention.

Figure 13:
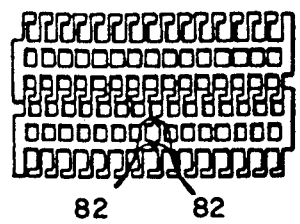
FIG. 13 is a top view illustrating the lateral interconnection of modules to form a conveyor belt of intended width.

In the embodiment of FIGS. 8–11, the modules are constructed for side-to-side assembly into a belt of intended overall width. One side of each module includes projections 82 which are extensions of the transverse sections 32 and 34 and which extend to a plane which is substantially midway between the gap of adjacent link ends. These projections engage like projections of a laterally adjacent module in an assembled belt to provide spacing and support of the laterally connected modules. Preferably, the modules are integral multiples of one another in width such that modules can be assembled in brick-laid fashion as shown in FIG. 13, with a module extending across the gap between two or more linked modules. The module can include a side rail if this module is to be at the lateral end of an assembled conveyor belt or, if the module is to be assembled at an intermediate position within a belt, can include projections 82 on each side. It will be appreciated that the embodiment of FIGS. 1–4 can also include projections 82 on one or both sides, rather than one or both side rails, for side-to-side assembly into belts of intended width.

The modules described above are preferably fabricated as an integral unitary structure by injection molding of a plastic material such as polyethylene. The particular plastic material is determined in accordance with the characteristics desired to suit a particular operating environment. The pivot rods and retaining pins are typically of the same more compatible plastic material. It is contemplated that changes and modifications may be made in the invention without departing from the spirit and true scope thereof. Accordingly, the invention is not to be limited by what has been particularly shown and described except as indicated in the appended claims.

What is claimed is:

1. A module for use in constructing a linked conveyor belt comprising:
   a body member having first and second pluralities of link ends;
   at least two of said link ends of said first and second pluralities including an opening to receive a pivot rod to permit pivotable rotation of said module thereabout, said openings in said first and second pluralities defining respective first and second pivot rod axes; and
   an abutment attachable to and cooperative with at least one of said at least two link ends for occluding at least a portion of the respective opening to prevent the passage of a pivot rod through the opening, said abutment being in non-interlocking relation with said pivot rod, and being installable into and removable from a slot in said at least one link end, said slot extending in a direction transverse to a plane defined by said respective first and second pivot rod axes.

2. The module of claim 1 wherein said abutment is separate from said module.

3. The module of claim 1 wherein said module includes an outermost link end on at least one of said first and second pluralities and said abutment is adapted for removable engagement with said outermost link end.

4. The module of claim 1 wherein said slot is a subtantially rectangular slot and said abutment has a substantially rectangular cross-section dimensioned to permit said abutment to be disposed within said slot.

5. The module of claim 4, wherein said abutment is furcated.

6. A conveyor belt having a direction of intended travel and first and second sides transverse to the direction of intended travel, comprising:
   a plurality of plastic modules having first and second opposing pluralities of link ends;
   a plurality of pivot rods pivotally interconnecting adjacent plastic modules;
   at least one link end of said first and second opposing pluralities of link ends including a first opening for receiving a respective one of said plurality of pivot rods;
   a plurality of outermost link ends along said first and second sides, at least two of said outermost link ends having a second opening transverse to a plane defined by said pivot rods and sized to receive a pivot rod abutment; and
   a plurality of furcated pivot rod abutments, attachable to and cooperative with at least one of said at least two outermost link ends, for occluding at least a portion of said first opening to prevent passage of said respective one of said plurality of pivot rods therethrough, said furcated pivot rod abutments being in non-interlocking relation with said respective one of said plurality of pivot rods.

7. The conveyor belt of claim 6 wherein each of said plurality of furcated pivot rod abutments is adapted for removable engagement with at least one of said outermost link ends.

8. The conveyor belt of claim 6 wherein said second opening includes a substantially rectangular slot.

9. A plastic module for use in retaining a pivot rod within a modular plastic belt having at least one direction of intended travel, said module having first and second opposing ends, a width transverse to the direction of intended travel and comprising:
   at least one link end on the first end of the module;
   at least one link end on the second end of the module;
   at least one of said link ends on said first and second opposing ends comprising a blocking link end, said blocking link end having a hole extending through the respective link end dimensioned to permit passage of a pivot rod through the link end;
   said blocking link end having an opening defining first and second engagement surfaces, said opening having an entry portion adjacent an exterior surface of said blocking link end with a first width and a major portion interior to said blocking link end with a second width, said second width being greater than said first width;
   a retaining member including first and second camming surfaces;
   said retaining member being removably insertable within said opening of said blocking link end and at least partially blocking said hole within the blocking link end when disposed within said opening;
   said first camming surface of said retaining member being operative to facilitate the insertion of said retaining member into said blocking link end and said second camming surface being cooperative with said second engagement surface, when said retaining member is disposed in said blocking link end, to retain said retaining member within said blocking link end;

said retaining member preventing passage of a pivot rod through said hole in said blocking link end when disposed within said link end.

10. The module of claim 9 wherein said second camming surface of said retaining member is operative during removal of said retaining member from said blocking link end to facilitate the removal of said retaining member from said blocking link end through sliding engagement of said second camming surface with said second engagement surface.

11. The module of claim 9 wherein said blocking link end has a top surface and bottom surface and said opening extends at least partially through said blocking link end between said top surface and said bottom surface.

12. The module of claim 9 wherein said retaining member comprises a flexible plastic member.

13. The module of claim 12 wherein said retaining member comprises a flexible plastic furcated member.

14. The module of claim 9 wherein said opening in said blocking link end is substantially rectangular.

15. The module of claim 9 wherein said retaining member is an integrally formed plastic member.

16. The module of claim 9 wherein at least one of said first and second camming surfaces is curved.

17. A modular plastic conveyor belt comprising:
a plurality of modules;
a plurality of pivot rods linking said modules, said pivot rods defining first and second pivot rod axes for a respective one of said plurality of modules;
at least some of said modules including a blocking link end having a hole extending therethrough and dimensioned to permit passage of one of said pivot rods through the respective link end;
said blocking link ends having an opening comprising a slot defining first and second engagement surfaces, said slot extending in a direction transverse to a plane defined by said first and second pivot rod axes;
a plurality of retaining members having first and second camming surfaces, said retaining members being removably insertable within the openings of the respective blocking link ends so as to at least partially occlude the holes of the respective blocking link ends when disposed therein, and
wherein a plurality of said retaining members are insertable into and removable from the openings of the respective blocking link ends in a direction transverse to a plane defined by said first and second pivot rod axes of a respective module.

18. The modular plastic conveyor belt of claim 17 wherein said belt includes first and second edges and said modules including said blocking link ends are disposed adjacent to at least one of said first and second edges.

19. The modular plastic belt of claim 17 wherein said second camming surfaces of said retaining members are operative during removal of said retaining members from said respective blocking link ends to facilitate the removal of said retaining members from the respective blocking link ends through sliding engagement of said second camming surfaces with said second engagement surfaces.

20. The modular plastic belt of claim 19 wherein said blocking link ends have a top surface and a bottom surface and said openings extend at least partially through said blocking link ends between said top surface and said bottom surface to permit insertion of said retaining members into the respective blocking link ends through the openings in one of said surfaces of the blocking link ends.

21. The modular plastic belt of claim 17 wherein said retaining members comprise flexible members.

22. The modular plastic belt of claim 17 wherein said retaining members comprise flexible plastic furcated members.

23. The modular plastic belt of claim 17 wherein said openings in said blocking link ends are substantially rectangular.

24. The modular plastic belt of claim 17 wherein said retaining members are integrally formed plastic members.

25. The modular plastic belt of claim 17 wherein said first camming surfaces are curved.

26. The modular plastic belt of claim 17 wherein at least one of said first and second camming surfaces is curved.

27. The conveyor belt of claim 8 wherein said at least one of said plurality of furcated pivot rod abutments is installable into and removable from said at least one of said outermost link ends in a direction orthogonal to a plane defined by said first and second opposing pluralities of link ends.

28. The module of claim 9 wherein said retaining member is insertable into and removable from said opening of said blocking link ends in a direction orthogonal to a plane defined by said at least one link end on the first and second sides of the module.

29. A link end of a module for retaining a pivot rod in a modular plastic conveyor belt, comprising:
a plastic link end having a first opening for receipt of said pivot rod and a second opening for receipt of an abutment, said second opening having a first dimension adjacent a link end exterior surface and a second dimension interior to said link end, said second dimension being greater than said first dimension;
said abutment being attachable to and cooperative with said link end for occluding at least a portion of said first opening and preventing passage of said pivot rod through said first opening, said abutment being in non-interlocking relation with said pivot rod, and said abutment being removably installable into said link end second opening, and said link end being free of substantial deformation upon installation of said abutment therein.

30. The link end of claim 29 wherein said abutment is installable into and removable from said end member in a direction orthogonal to the axis of said pivot rod.

31. The link end of claim 29 wherein said first opening and said second opening are different openings.

32. The link end of claim 29 wherein said abutment comprises a flexible plastic furcated member.

33. The link end of claim 29 wherein said abutment is separate from said link end.

34. The link end of claim 29 wherein said second opening is a substantially rectangular slot dimensioned to receive said abutment.

35. The conveyor belt of claim 6 wherein said first and second openings are different openings.

36. The link end of claim 29 wherein said abutment is deformable.

37. A module, having first and second ends, for use in the construction of a modular plastic conveyor belt comprising:
  at least one link end on said first end of said module;
  at least two link ends on said second end of said module;
  said link ends on said first and second ends having openings sized to receive a pivot rod therethrough to permit pivotable interconnection of adjacent modules when assembled in a belt, said link ends having a top side and a bottom side and said openings sized to receive said pivot rod on said first and second ends defining first and second respective pivot rod axes;
  at least one of said link ends having a substantially rectangular slot extending at least partially through the link end from the top side toward the bottom side in a direction substantially orthogonal to a plane defined by the first and second respective pivot rod axes, said substantially rectangular slot being sized and adapted to receive a cooperative abutment;
  an abutment removably insertable within said substantially rectangular slot for occluding at least a portion of the respective opening, said abutment being in non-interlocking relation with said pivot rod when disposed within said slot.

38. The module of claim 37 wherein said abutment further includes a portion extending from said abutment to retain said abutment in said slot.

39. The module of claim 38 wherein said portion extending from said abutment extends in a direction of intended travel of said belt.

40. The module of claim 37 wherein said abutment is furcated to facilitate insertion and removal of said abutment from said substantially rectangular slot.

41. A link end of a conveyor belt module for use within a plastic modular conveyor belt for retaining a pivot rod, said pivot rod defining a pivot rod axis when disposed in assembled relation within said module, said conveyor belt having at least one direction of intended travel, comprising:
  a plastic end member having a pivot rod opening sized to permit passage of said pivot rod therethrough, said pivot rod opening being substantially coaxial with said pivot rod axis;
  said plastic end member having an abutment opening sized to receive an abutment, said abutment opening having a first dimension adjacent a plastic end member exterior surface and a second dimension interior to said plastic end member, said abutment opening second dimension being greater than said abutment opening first dimension;
  an abutment for disposition within said end member abutment opening, said abutment having a first portion with a first dimension less than or equal to said abutment opening first dimension and a second portion with a second dimension less than or equal to said abutment opening second dimension upon installation of said abutment within said opening;
  said abutment being removably installable within said abutment opening and at least partially blocking said pivot rod opening to prevent passage of said pivot rod through the pivot rod opening when said abutment is installed within said abutment opening.

42. The link end of claim 41 wherein said abutment opening is defined by abutment opening surfaces within said plastic end member and said abutment first and second portions are cooperative with said plastic end member abutment opening surfaces to retain said abutment within said plastic end member.

43. The link end of claim 41 wherein said abutment opening is orthogonal to said pivot rod axis.

44. The link end of claim 41 wherein said pivot rod opening and said abutment opening are different openings.

45. The link end of claim 41 wherein said plastic end member has a first conveying surface and a second surface and said abutment opening is dimensioned and adapted to permit installation of said abutment into said plastic end member abutment opening through said first conveying surface and toward said second surface.

46. The link end of claim 41 wherein said abutment at least partially occludes said pivot rod opening within said plastic end member when said abutment is installed within said abutment opening of said plastic end member.

47. The link end of claim 41 wherein said abutment is a plastic furcated member and said second portion of said abutment is compressible to decrease the second portion second dimension during installation of said abutment within said plastic end member abutment opening.

48. The link end of claim 41 wherein said abutment is in non-interlocking relation with said pivot rod when said abutment is installed within said plastic end member abutment opening.

* * * * *